United States Patent
Walton

[15] 3,656,624
[45] Apr. 18, 1972

[54] APPARATUS FOR COLLECTING WASTE FROM THE SURFACE OF A BODY OF WATER

[72] Inventor: James F. Walton, 129 Front Street, Marblehead, Mass. 01945

[22] Filed: Dec. 12, 1969

[21] Appl. No.: 884,510

[52] U.S. Cl. ...................210/242, 210/523, 210/DIG. 21
[51] Int. Cl. .................................................E02b 15/04
[58] Field of Search............210/170, 242, 523, 526, DIG. 21

[56] References Cited

UNITED STATES PATENTS

| 1,591,024 | 7/1926 | Dodge | 210/DIG. 21 |
| 2,635,104 | 4/1953 | Chayen | 210/523 X |
| 3,219,190 | 11/1965 | Thune | 210/242 |
| 3,517,812 | 6/1970 | Bucchioni et al. | 210/DIG. 21 |
| 3,539,048 | 11/1970 | Pearson | 210/DIG. 21 |

FOREIGN PATENTS OR APPLICATIONS 308,940   6/1933   Italy.....................................210/242

Primary Examiner—Samih N. Zaharna
Attorney—Martin Kirkpatrick

[57] ABSTRACT

A waste collecting vessel including an impeller assembly comprising a cylindrical support and a plurality of flexible, circumferentially supported blades extending longitudinally of and radially extending from the support, the diameter of the support being greater than the height of each blade. Preferably, the blades are individually mounted and the vessel includes a lip member for folding the blades when the support is rotated in one direction, a skimmer for engaging the blades when the support is rotated in the other direction, and a system for removing materials from the bottom of a deep well of a waste collection tank and for transporting waste from within the tank to storage tanks within support pontoons.

21 Claims, 7 Drawing Figures

PATENTED APR 18 1972 3,656,624

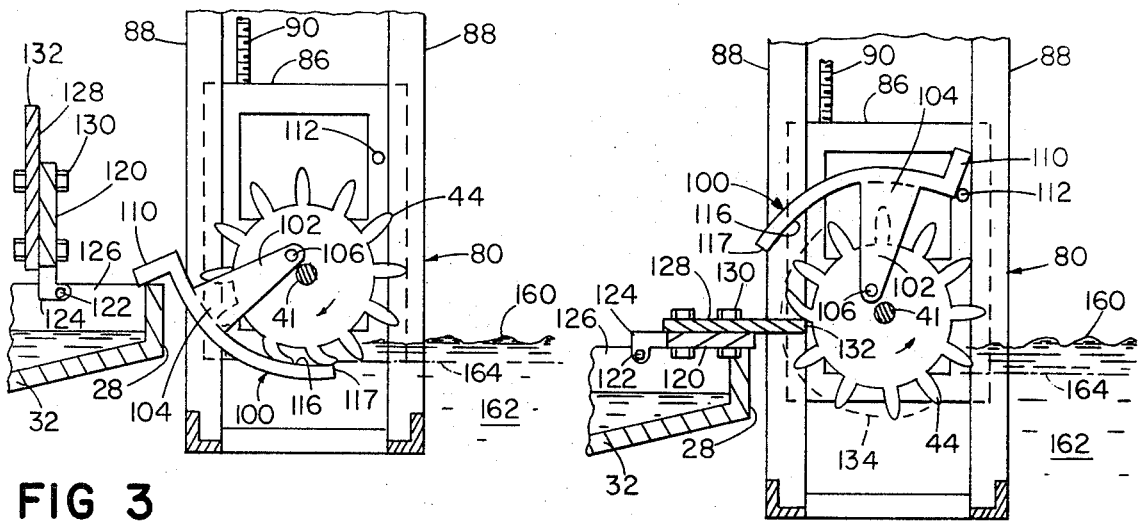
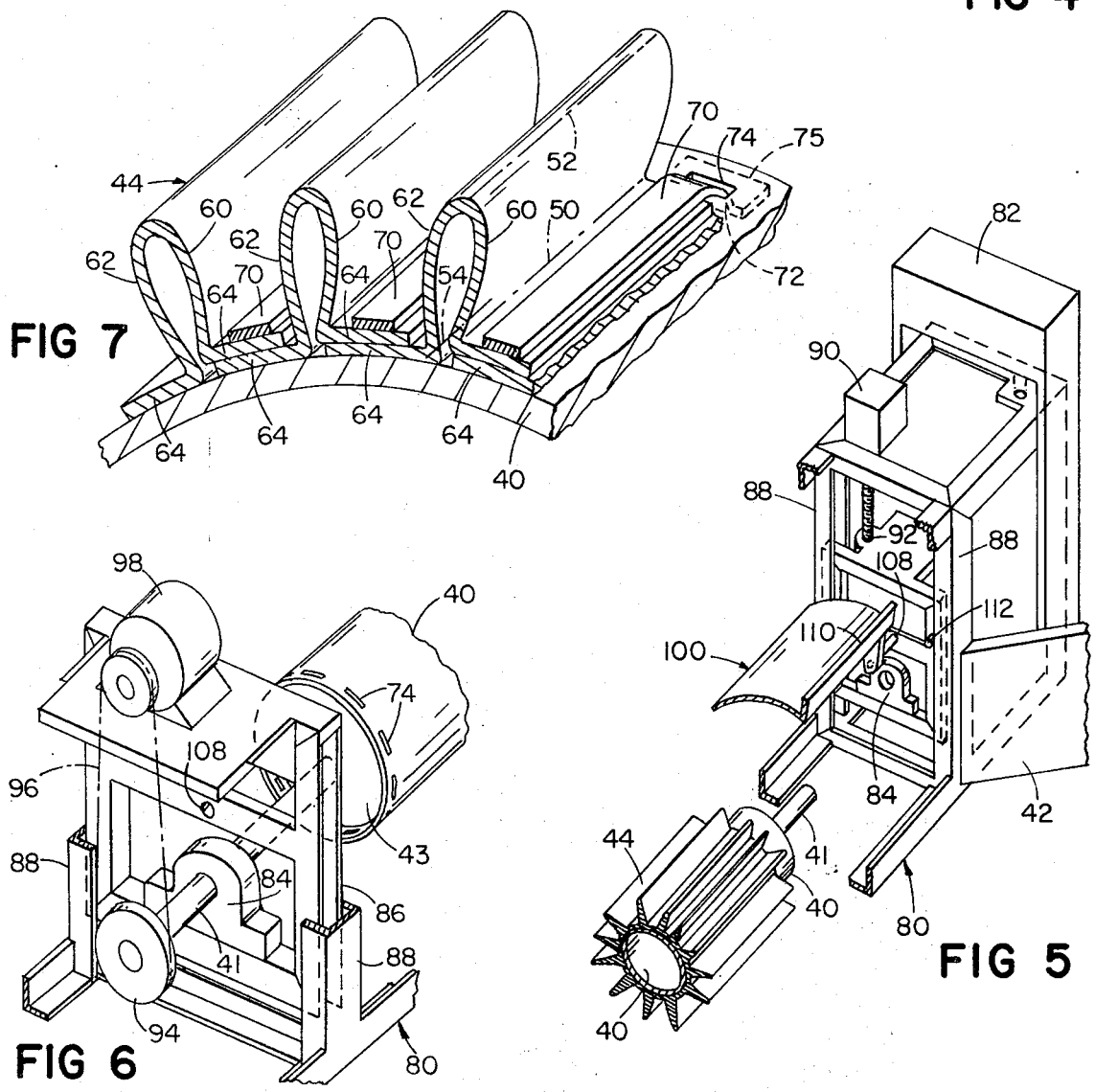

APPARATUS FOR COLLECTING WASTE FROM THE SURFACE OF A BODY OF WATER

This invention relates to waste collecting.

It is a principal object of the present invention to provide a novel method and apparatus for efficiently removing waste, particularly floating oil and scum, from calm or rough water. Other objects include reducing the amount of water collected with the waste and providing easily land transportable apparatus which has a large self-contained waste storage capacity.

The invention features a waste collecting vessel including an impeller assembly comprising a cylindrical support and a plurality of flexible, circumferentially supported, blades extending longitudinally of and radially extending from the support, the diameter of the support being greater than the height of each blade. In preferred embodiments there is featured individually and detachably mounted blades, a lip member for folding the blades when the support is rotated in a direction, a skimmer plate for engaging the blades when the support is rotated in the other direction, and a pipeline system for removing materials from the bottom of deep well of the tank and from within the tank and transporting waste to storage areas within support pontoons.

Other objects, features and advantages will appear from the following detailed description of a preferred embodiment of the invention, together with the attached drawings in which:

FIGS. 3 and 4 are sectional plan views of portions of the vessel of FIG. 1; and

FIGS. 5–7 are perspective views, partially in section, of portions of the impeller assembly of the vessel of FIG. 1.

Figure 1:
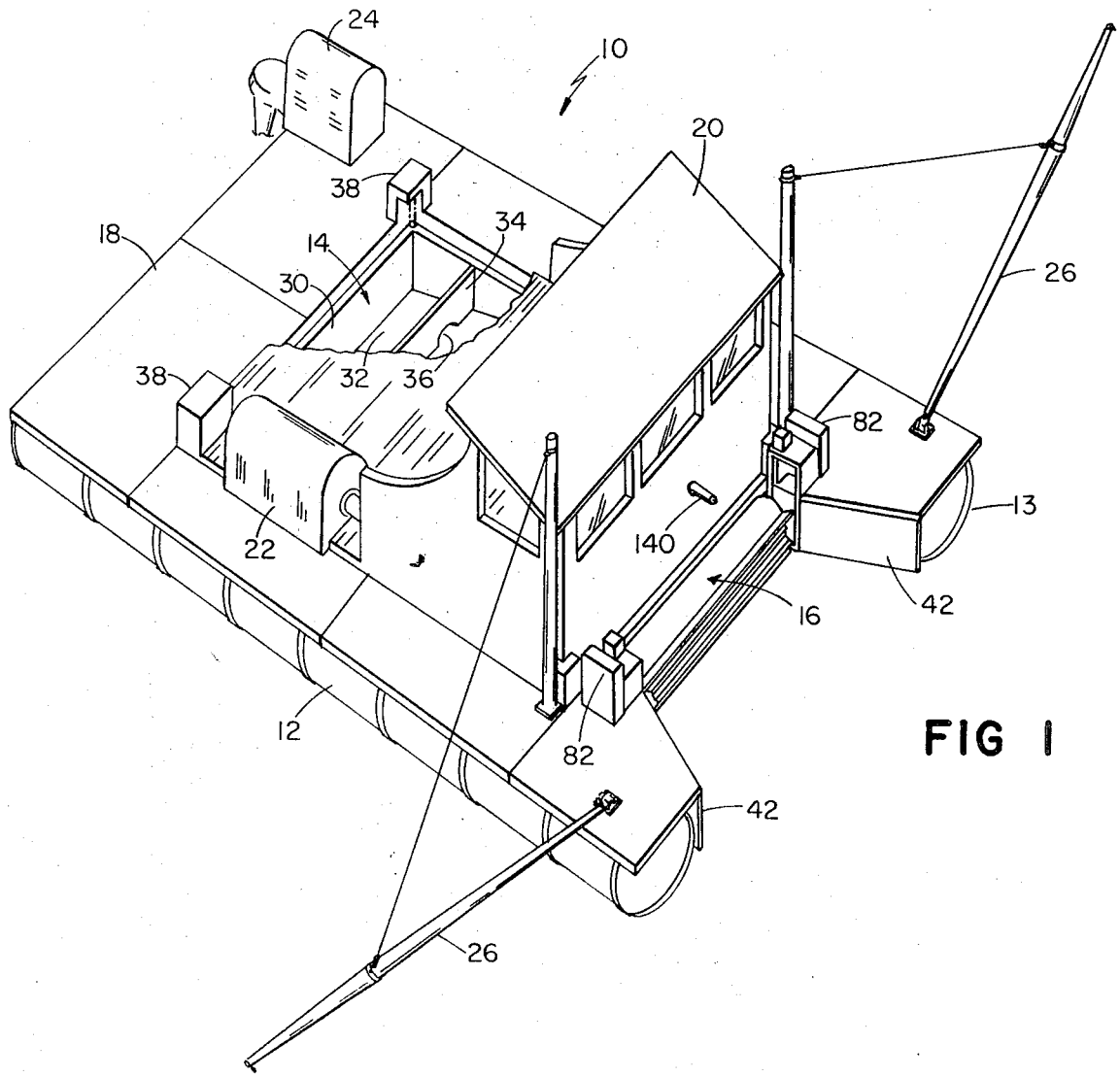
FIG. 1 is a perspective view of a waste collection vessel constructed according to the invention.

Referring more particularly to the drawings, there is shown a waste collection vessel 10 comprising a pair of spaced, parallel cylindrical pontoons 12, 13 (each 40 feet long and 4 feet in diameter) and, mounted between the pontoons, a rectangular separation tank 14 and an impeller assembly 16. On the vessel's deck 18 are provided an enclosed control house 20, a centrifugal separator 22, an inboard-outboard motor 24, and a pair of scissor boom assemblies 26.

Separation tank 14 is open at the top, 25 ft. long, 20 feet wide, two feet high at its bow end 28, and four feet high at its stern end 30. The top edge of the tank is mounted substantially horizontally so that the bottom 32 of the tank slopes downwardly from front to rear. A plurality of spaced, parallel baffles 34, each of which includes a member of semi-circular flow openings 36 in the edge thereof adjacent tank bottom 32, extend transversely of tank 14. A cable adjustment assembly 38 is mounted adjacent each corner of tank 14. Each assembly includes a winch mounted on vessel 10 and a cable attached to tank 14. By adjusting assemblies 38, the elevation and trim of tank 14 may be varied within a wide range.

Impeller assembly 16 includes a cylindrical steel drum 40 (20 feet long, 20 inches diameter) mounted on a rotatable shaft 41. Impeller assembly is set back approximately 5 feet from the bow of vessel 10 with each end of drum 40 five feet inboard of pontoons 12, 13. A vertical side plate 42 extends from inboard the bow end of each of pontoons 12, 13 to the adjacent end of drum 40. A plurality of flexible rubber blades 44 are mounted on and extend radially outwardly from the cylindrical surface of drum 40. As most clearly shown in FIG. 7, each blade 44 is formed of a single sheet of oil-impregnated rubber material having a width of 16 inches and a length slightly less than that of drum 40. Each sheet is folded longitudinally into quarters (along parallel fold lines 50, 52, 54) to form a pair of central radially-extending blade portions 60, 62 and, on either side of the blade portions, a support portion 64. As shown, the fold line 52 between blade portions 60, 62 forms the outer free edge of blade 44; the height (from the cylindrical surface of drum 40 to fold line 52) of each blade is approximately 4 inches.

For holding the blades in place on drum 40, the support portions of 64 of adjacent blades are overlapped, the trailing (when the drum is rotated clockwise as viewed in FIG. 7) support portion 64 of the leading blade lying directly on the surface of drum 40 and the leading support portion 64 of the trailing blade being directly juxtaposed therewith. A steel band 70, each end 72 of which extends through a slot 74 in drum 40, overlies the upper one of each pair of support pontoons 64. As shown in FIGS. 6 and 7, the cylindrical surface of drum 40 extends axially beyond the drum end plates 43 which support shaft 41 and slots 74 extend through the overhanging portion of the cylindrical surface. Each end 72 of band 70 is fixed to a retaining member 75 below slot 74. When band 70 is tightened, using a conventional banding machine, the approximately 2,000 pounds of tension thereby produced in the band holds the underlying support portions 64 tightly against drum 40.

Impeller assembly 16 includes an open, angle iron, box frame 80 secured at its ends to supports 82 on pontoons 12, 13 by cable assemblies (not shown), each of which includes a power driven winch fixedly secured to one of supports 82 and a cable extending from the winch to an adjacent portion of frame 80. By relatively adjusting the cable assemblies, frame 80 may be moved vertically and tilted relative to the water surface.

Each end of the shaft 41 extending coaxially through drum 40 is supported by a bearing 84 mounted in a vertically adjustable slide 86. Each slide 86 fits within a pair of vertical, facing, U-shaped in cross-section, angle iron guides 88 which form part of frame 80. Vertical movement of the slides is provided by a pair of motor-driven screw drives 90 mounted on frame 80 and engaging adjustment nuts 92 on the slides. For rotating drum 40, a ratchet wheel 94 is mounted on one end of shaft 42 and a chain drive 96 connects wheel 94 to a reversible, variable speed motor 98.

An arcuate skimmer plate 100, having a diameter greater than the overall diameter of blades 44 and a length slightly less than the longitudinal distance between slides 86, extends between the slides with its axis parallel to the axis of drum 40. Skimmer 100 is mounted on slides 86 by a pair of support arms 102, one end 104 of each arm being welded to the skimmer plate and the other end 106 of each arm carrying a shaft which is journaled within a bearing 108 in the adjacent one of slides 86. A rectangular stop plate 110 is welded along one edge of skimmer 100 and extends radially outwardly therefrom in position for engaging the forward edge of tank 16. A stud 112 extends inwardly from each of slides 86 in position for engaging plate 110 when the skimmer is in the position shown in FIG. 4.

As shown, bearings 108 are mounted eccentrically relative to the axis of drum 44. Skimmer 100 is rotatable about bearings 108 between the position shown in FIG. 4, wherein the skimmer is above and spaced from blades 44 and plate 110 engages studs 112, and the position shown in FIG. 3, wherein stop plate 110 engages the leading edge 28 of tank 14 and the skimmer is generally below blades 44. In the FIG. 3 position, the distance from the axis of drum 40 to the nearest portions of the inner arcuate surface 116 of skimmer 100 is slightly less than the radius of blades 44 so that, as shown, the blades wipe the skimmer surface as the drum is rotated.

Referring now to FIGS. 3 and 4, a rectangular plate 120 overlies each of the forward corners of tank 16, and is pivotally connected to the tank by a pin 122 extending through a downwardly extending lug 124 of the plate and the adjacent side wall (port side wall 126 in FIGS. 3 and 4) of the tank. A lip plate 128 extends transversely of tank 16 and is secured at its ends to plates 120 by bolts 130. As shown in FIG. 4, when plates 120 are in position engaging the forward corners of tank 16, the forward 132 of lip plate 128 lies within the bounds of cylindrical surface 134 generated by the outer edges of blades 44 during rotation of drum 40. A series of bolt holes are provided at each end of lip plate 128 so that it may be fixed in number of positions at various distances from drum 40. When lip plate 128 is positioned (as in FIG. 4) for engaging blades 44, skimmer 100 is above and spaced from drum 40. To permit skimmer 100 to be rotated into position below blades (as in FIG. 3) the supports 120 and lip plate 128 are pivoted away from drum 40 and the forward edge of tank 14.

Figure 2:
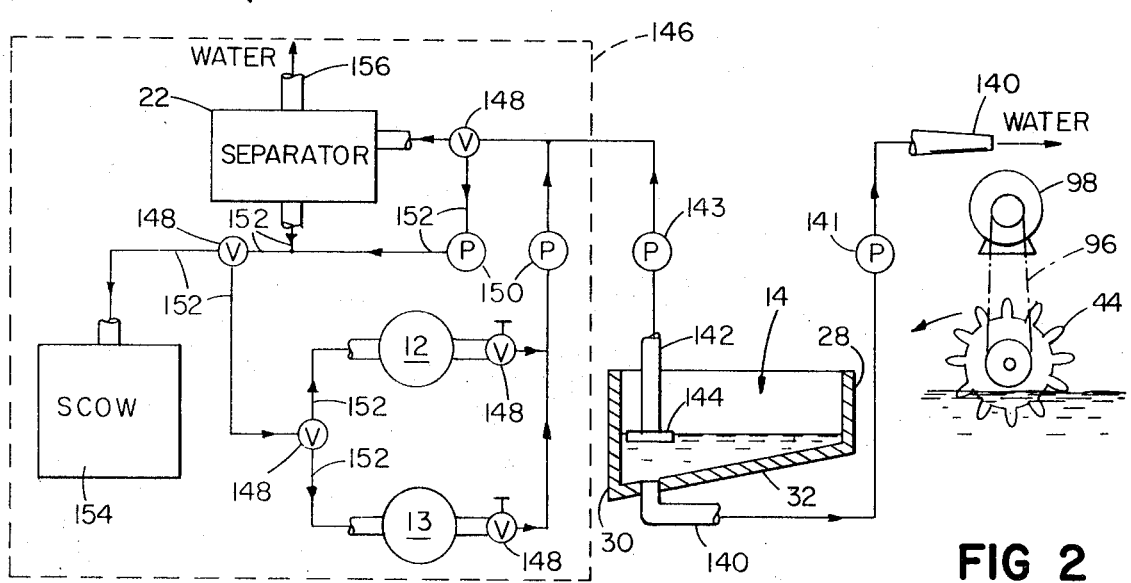
FIG. 2 is a diagrammatic view illustrating the operations of the vessel of FIG. 1.

Referring now to FIG. 2, two pipelines, designated 140, 142 respectively and each including a pump 141, 143, are provided for pumping waste and water from tank 14. Line 140 extends from the deep end of tank bottom 32 to forward of control house 20, above impeller assembly 16. Line 142 extends from a floating intake 144 within tank 14 to an outlet system, generably designated 146. As shown, outlet system 146 includes valves 148, pumps 150 and interconnecting pipes 152 so arranged as to permit waste from tank 14 to be pumped (either through or by-passing separator 22) to storage tanks within either dump scow 154 or pontoons 12, 13. System 146 also provides for pumping liquids (again either through or by-passing separator 22) from either of the in-pontoon storage tanks to the other in-pontoon tank or to the scow. Water from separator 22 is pumped overboard through pipe 156.

To permit easy transportation overland, each of the major components of vessel 10 is made of sections which are bolted together for use and separated for loading onto a truck. For example, tank 14 is made of four sections which may be stacked one inside the other when separated, each pontoon 12, 13 may be divided in half midway its respective length, and the deck of the vessel is made of eight pieces of heavy plywood.

In operation, oil or other waste 160 floating on a body of water 162 is transported from the water surface into tank 14 by impeller assembly 10. The vessel may either be advanced into a spillage by motor 24, or, alternatively, the waste may be drawn into the impeller by oil booms (not shown, but of known design) one end of each of which is attached to the vessel through one of boom assemblies 26, and the other end of which is attached to a small boat.

Generally, vessel 10 works most efficiently when its stern is to windward, the vessel thus acting to break up waves and provide a relatively smooth area adjacent the impeller. Skimmer 100 and lip plate 128 may be placed in the positions illustrated in FIG. 3, frame 80 adjusted so that leading edge 117 of skimmer is just below the line 164 between the floating oil and water, and drum 40 rotated clockwise (as viewed in FIG. 3). As the drum rotates the oil is swept up the surface 116 of skimmer 100 and into tank 14.

Skimmer 100 and lip plate 128 may also be placed in the FIG. 4 position, and frame 80 is adjusted so that oil-water line 164 is only slightly below the axis of drum 40, and the drum is rotated counterclockwise (as viewed in FIG. 4). As drum 40 rotates, each blade 44 lifts oil from the water surface and carries the oil over the top of the drum toward tank 16. Lip plate 128 bends each blade 44 (as shown in FIG. 4) as the blade passes the adjacent edge of tank 14, forcing waste carried by the blade to flow over the lip member into tank 16.

In either case, the cylindrical drum 40 is positioned with its axis above the water surface (see FIGS. 3 and 4) so that the drum surface extends a substantial distance above the water surface.

Tank 14 is initially flooded to permit it to be submerged to the level required for proper relative positioning of oil-water surface 164, tank 14 and impeller assembly 16. The waste transported into the tank includes both oil and water, the oil and water will separate, and the oil will rise to the top. There is within tank 16, therefore, a top layer of oil, a bottom layer of water and (usually) an intermediate mixture. By using pump 141, an operator in control house 20 can draw water from the deep end of tank 14, discharging the water through the end of pipe 140 in front of the control house. When the water has been pumped out from under the oil and water-oil mixture, the color of the discharge will abruptly change. The operator will then turn off pump 141 and, using floating intake 144 and system 146, pump waste from the tank either into scow 154 or, if the amount of waste is small or the scow is being emptied elsewhere, into one of the storage tanks in pontoons 12, 13.

Centrifugal separator 22 increases the effective storage capacity of the scow and in-pontoon tanks by discharging water from the oil-water mixture overbound, and directing only the residue into the desired tank or scow. As shown, waste may be directed through separator 22 either as it is initially withdrawn from tank 14, or upon withdrawal from either of the in-pontoon tanks.

Blades 44 wear rather rapidly, especially when vessel 10 is being used as shown in FIG. 4. Any single blade may be replaced as required by cutting the two bands 70 holding it in place, removing the old blade and bands, folding a replacement sheet into blade form, and (using a conventional hand-operated steel banding machine) fixing the new blade into position on drum 40.

Other embodiments within the scope of the following claims will occur to those skilled in the art.

What is claimed is:

1. In a vessel for collecting waste from the surface of a body of water and including a tank for receiving said waste and an impeller assembly disposed on one side of said tank and arranged for conveying said waste from said surface to said tank, that improvement wherein said impeller assembly comprises:
   a substantially cylindrical support mounted for rotation with the axis thereof substantially parallel to said surface,
   the diameter of said support being at least about 20 inches whereby said support extends a substantial distance above said surface when said support is positioned with said axis thereof above said surface;
   a plurality of circumferentially-spaced flexible blades mounted on the peripheral surface of said support, each of said blades comprising a flexible sheet extending longitudinally of and radially outwardly from said surface,
   the diameter of said surface being greater than the distances from said surface to the free edge of each of said blades;
   a skimmer disposed generally below said support and having a trailing edge adjacent said side of said tank and a leading edge spaced from said tank below said support; and,
   means for rotating said support,
   said blades cooperating with said skimmer during rotation of said support for sweeping waste material from said body along said skimmer to said tank.

2. The vessel of claim 1 including an elongated lip member supported with respect to said tank and extending longitudinally of said support, an edge of said lip member being substantially parallel to said axis and being positioned within the cylinder generated by a free edge of one of said blades during rotation thereof whereby said lip member causes bending of said blade during said rotation.

3. The vessel of claim 2 wherein said lip member is movable between a first position wherein said edge is within said cylinder and a second position wherein said lip member is wholly without said cylinder.

4. The vessel of claim 1 wherein each of said blades comprises a plurality of generally parallel sheet portions of flexible material detachably secured to said support.

5. The vessel of claim 4 wherein each of said blades includes a sheet of flexible material folded along not less than two spaced, parallel, longitudinally-extending fold lines and including a support portion overlying a portion of said surface of said support and a blade portion extending radially outwardly from said surface.

6. The vessel of claim 5 wherein each of said sheets includes two sheet portions extending radially outwardly from said surface.

7. The vessel of claim 4 wherein each of said sheets of flexible material is folded along three spaced, parallel longitudinal fold lines and includes two blade portions extending radially outwardly from said support surface and two support portions overlying portions of said support surface.

8. The vessel of claim 7 wherein the support portions of the sheets of adjacent blades are in face-to-face engagement, and including a connector associated with each pair of engaged support portions and connected to said support for securing said each pair to said support.

9. The vessel of claim 8 wherein each of said connectors comprises a steel band extending longitudinally of said support and overlying an engaged pair of support portions, said band being secured to said support adjacent the opposite axial ends of said engaged pair.

10. The vessel of claim 1 wherein said tank includes a well portion of substantially greater depth than the depth of other portions of said tank, and said vessel includes a first conduit extending from said well portion for withdrawing material of relatively high density from within said tank and a second conduit extending from within said tank for withdrawing waste material from within said tank.

11. The vessel of claim 10 wherein said tank is rectangular, the leading edge of said tank is positioned parallel and adjacent said support, and said well portion is adjacent the trailing edge of said tank.

12. The vessel of claim 11 wherein the bottom of said tank is substantially planar, and depth of said well portion is not less than twice the depth of a minimum depth portion of said tank.

13. The vessel of claim 10 wherein said vessel includes a pair of spaced support pontoons, each of said pontoons includes an internal waste storage area, and including a pipeline system for transporting waste from said tank to a selected one of said storage areas and from one of said storage areas to another of said storage areas.

14. The vessel of claim 13 wherein said pipeline system includes a separator for removing water from said waste and means for discharging said removed water and transporting the residue of said waste to one of said storage areas.

15. The vessel of claim 1 wherein said skimmer is arcuate and of diameter not less than the diameter of said support, said skimmer being mounted with the axis thereof generally parallel to the axis of said support and extending generally forwardly and downwardly from the leading edge of said tank, and said blades engage said skimmer during said rotation.

16. The vessel of claim 15 wherein said support and said tank are relatively movable in a generally vertical direction.

17. The vessel of claim 15 wherein said skimmer and said support are relatively movable between a first position wherein said blades engage said skimmer and a second position wherein said skimmer is spaced from said blades.

18. In a vessel for collecting waste from the surface of a body of water and including a tank for receiving said waste and an impeller assembly disposed on one side of said tank and arranged for conveying said waste from said surface to said tank, that improvement wherein said impeller assembly comprises;
 a substantially cylindrical support mounted for rotation with the axis thereof substantially parallel to said surface;
 a plurality of circumferentially-spaced flexible blades mounted on the peripheral surface of said support, each of said blades comprising a flexible sheet extending longitudinally of and radially outwardly from said surface, the diameter of said support being greater than the distances from said surface to the free edge of each of said blades;
 means for rotating said support; and,
 an arcuate skimmer of diameter not less than the diameter of the cylinder generated by a free edge of one of said blades during rotation of said support, said skimmer being disposed on the side of said tank nearest said support with the axis thereof parallel to the axis of said support, and being movable between a first position generally above said support wherein said skimmer is spaced from said blades and a second position generally below said support wherein said blades engage said skimmer during said rotation and sweep waste material from said body along said skimmer to said tank.

19. The vessel of claim 18 wherein said skimmer is mounted eccentrically relative to said support for rotational movement between said first and second positions.

20. The vessel of claim 19 wherein said skimmer includes a stop member secured along one longitudinal edge portion thereof, said stop member engaging a cooperating portion of said tank when said skimmer is in said second position for retaining said skimmer in said second position.

21. The vessel of claim 18 including an elongated lip member supported with respect to said tank and extending longitudinally of said support, an edge of said lip member being substantially parallel to said axis and being positioned within said cylinder whereby said lip member causes bending of said blade during said rotation.

* * * * *